United States Patent
Zaikos et al.

[11] Patent Number: 5,876,770
[45] Date of Patent: Mar. 2, 1999

[54] PROCESS AND FORMULATION FOR IMPROVED TEXTURE AND MELT OF REDUCED-FAT CHEESE PRODUCT

[75] Inventors: William John Zaikos, Chicago; David Webb Mehnert, Antioch; Gary Lee Kerrigan, Arlington Heights, all of Ill.

[73] Assignee: Kraft Foods, Inc., Northfield, Ill.

[21] Appl. No.: 890,120

[22] Filed: Jul. 9, 1997

[51] Int. Cl.[6] ................................. A23C 19/16
[52] U.S. Cl. .................. 426/89; 426/98; 426/99; 426/582; 426/601; 426/612
[58] Field of Search ............... 426/89, 98, 601, 426/612, 582, 99

[56] References Cited

U.S. PATENT DOCUMENTS

| | | | |
|---|---|---|---|
| 4,305,964 | 12/1981 | Moran et al. | 426/99 |
| 4,310,557 | 1/1982 | Suggs et al. | 426/98 |
| 4,844,921 | 7/1989 | Bakal et al. | 426/98 |
| 4,847,107 | 7/1989 | Linse-Loefgren | 426/582 |
| 4,894,245 | 1/1990 | Kielsmeier et al. | 426/68 |
| 4,997,670 | 3/1991 | Kielsmeier et al. | 426/582 |
| 5,030,470 | 7/1991 | Kielsmeier et al. | 426/582 |

*Primary Examiner*—Helen Pratt
*Attorney, Agent, or Firm*—Fitch, Even, Tabin & Flannery

[57] ABSTRACT

The invention generally relates to a reduced-fat cheese product and a method for producing such product. More specifically, this invention relates to reduced-fat, low-fat or fat-free natural shredded cheese products that do not exhibit the characteristics of stickiness and rapid skin formation upon melting which are normally associated with such cheeses. The cheese product of the invention, which has very low levels of fat, provides the taste and mouthfeel associated with full-fat cheeses. The fat content of shredded cheese is minimized by first producing an essentially fat-free natural cheese product and then applying a small amount of fat to the surface of the cheese in its shredded form. The amount of fat added can be controlled according to whether a reduced-fat, low-fat, or fat-free cheese is desired.

27 Claims, 1 Drawing Sheet

PROCESS AND FORMULATION FOR IMPROVED TEXTURE AND MELT OF REDUCED-FAT CHEESE PRODUCT

FIELD OF THE INVENTION

The present invention generally relates to reduced-fat, low-fat, or fat-free natural shredded cheeses and methods for producing these types of cheeses. More specifically, this invention relates to a reduced-fat, low-fat, or fat-free natural shredded cheese where a low fat content is maintained by applying a fat to the surface of the cheese shreds, which will provide the benefits associated with a full-fat cheese without significantly raising the level of fat.

BACKGROUND OF THE INVENTION

In recent years, there has been a substantial amount of research effort directed to reducing the amount of fat, particularly saturated fat, in foods. In particular, there is great interest in reducing the level of fat in cheese products. When the fat is removed from cheese, however, certain characteristics develop that limit the performance of the cheese product. These characteristics may be considered "defects" by consumers. It would be desirable, therefore, to develop a natural shredded cheese product which has very low levels of fat but which does not exhibit these characteristics.

Common consumer complaints regarding fat-free cheese products include a notable stickiness in the mouth when the product is consumed cold and the rapid formation of a thick "skin" in melted applications. In full-fat products, the presence of fat prevents the expression of these defects. The fat provides a level of lubrication which prevents the sensation of stickiness as the product is chewed. Further, in the case of melted applications, the fat at the surface of the melted cheese prevents rapid moisture loss due to evaporation, which results in the skin formation.

It would be desirable, therefore, to provide a reduced-fat, low-fat or fat-free natural shredded cheese which retains the body, texture, organoleptic properties, meltability and other desirable properties of natural cheese. It also would be desirable to provide a method of making a reduced-fat, low-fat or fat-free cheese wherein the positive benefits or characteristics of fat are maximized, but the amount of fat required is minimized. The present invention provides such a product and method.

SUMMARY OF THE INVENTION

Figure 1:
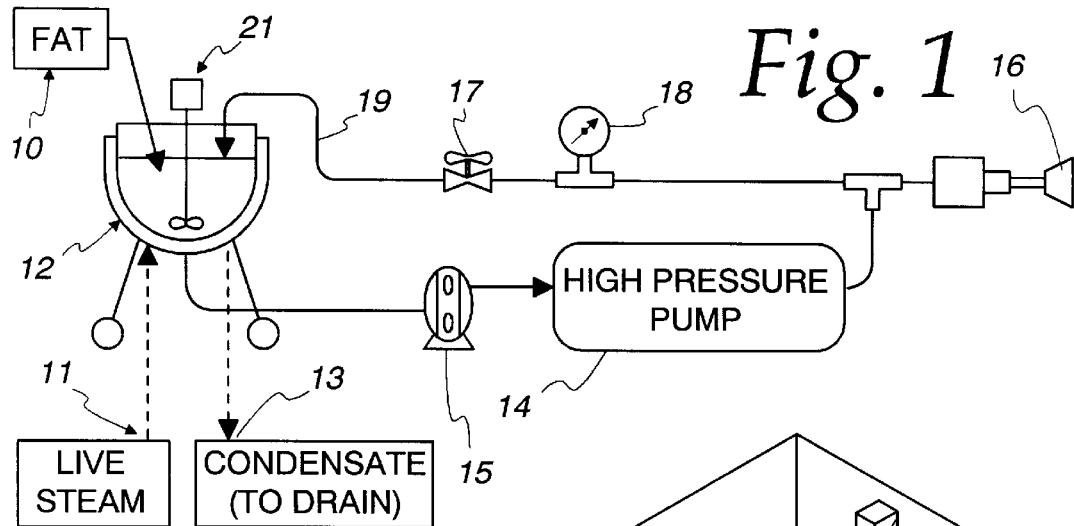
FIG. 1 is a process flow diagram illustrating an embodiment wherein a fat is applied to the surface of the shredded cheese using a high pressure pump.
Figure 2:
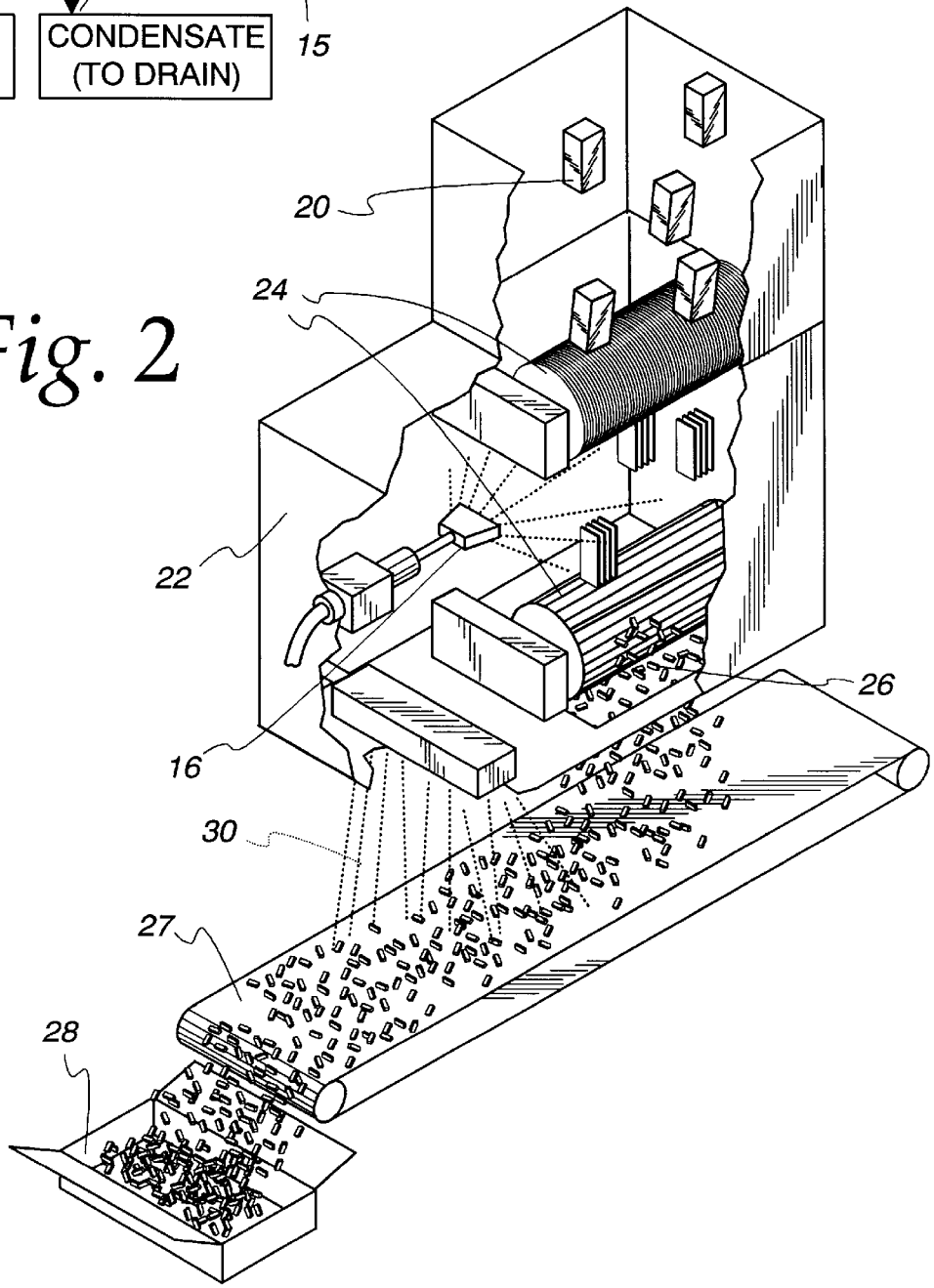
FIG. 2 is a schematic view of a cheese shredder showing a fat being applied to the surface of shredded cheese via the nozzle of FIG. 1.

The invention generally relates to the production of reduced-fat cheese. More specifically, this invention relates to a reduced-fat, low-fat or fat-free natural shredded cheese product that does not exhibit the characteristics of stickiness and rapid skin formation upon melting which are normally associated with such cheeses. The cheese product of the invention provides the taste and mouthfeel of full-fat cheeses but has lower fat levels (generally less than about 7 grams or less of fat per serving). For purposes of this invention, a "serving size" is considered to be about 30 grams of cheese.

For purposes of this invention, the term "reduced-fat" is generally used to mean a cheese product containing less than about 7 grams of fat per serving size (i.e., less than about 0.23 g fat/g cheese). The term "low-fat" is generally used to mean a cheese product containing less than about 3 grams of fat per serving size (i.e., less than about 0.1 g fat/g cheese). The terms "fat-free" and "essentially fat-free" are generally used interchangeably and are intended to refer to a cheese product containing less than about 0.5 grams of fat per serving size (i.e., less than about 0.02 g fat/g cheese). For purposes of this invention, "low-fat" also is intended to include "fat-free", and "reduced-fat" is intended to include both "lowfat" and "fat-free".

Strategically applying a small amount of fat on the surface of a reduced-fat shredded cheese significantly reduces or prevents the feeling of a notable stickiness in the mouth when the product is consumed cold and significantly reduces or prevents the formation of a "skin" when the cheese is melted. For purposes of this invention, the terms "fats" and "lipids" are used interchangeably and are intended to include that class of water insoluble molecules, including fats, oils and waxes. By applying fat in an amount no more than about 1.66% of the total weight of the cheese, the fat content of the cheese can be maintained below the maximum limit of 0.5 grams per serving necessary to designate a product as "fat-free", while still recognizing the desirable qualities associated with a full-fat cheese. Additional amounts of fat can be added to the cheese, depending on the final amount of fat desired in the product.

Application of a fat to the surface of the cheese also provides certain process-related benefits. For example, the fat increases the lubricity of the cheese, which ultimately results in increased output for the shredding process. Additionally, increasing the lubricity of the cheese may reduce or eliminate the need for an anti-caking agent. Further, natural and/or artificial oil soluble flavor components may be added to the fat and applied to the surface of the cheese, thereby maximizing flavor enhancement while minimizing the amount of flavor components required.

One object of the present invention is to provide a reduced-fat shredded cheese product having similar melt and mouthfeel characteristics as a full-fat cheese product. The invention maximizes desirable qualities associated with the fat but requires only low levels of fat by applying the fat predominantly on the surface of the cheese shreds. By doing so, the fat content of the cheese can be minimized. The amount of fat applied to a reduced-fat cheese should be no more than about 7 grams per serving of shredded cheese; in a low-fat cheese, preferably less than about 3 grams per serving size; and, for a fat-free cheese, preferably less than about 0.5 grams per serving.

Another object of the present invention is to provide a method for manufacturing a reduced-fat shredded cheese product, said method comprising applying a thin layer of a fat to particles of the cheese product, wherein the thin layer of fat provides improved organoleptic properties and wherein the resulting cheese product contains less than about 0.23 grams of fat per gram of cheese product. For a fat-free cheese, the amount of total fat should be less than about 0.5 grams per serving.

DETAILED DESCRIPTION OF THE INVENTION

The present invention relates to reduced-fat shredded cheese products and methods for producing such products. Preferably, the shredded cheese product is prepared from natural cheese. The fat content of the shredded cheese can be minimized by first producing a natural cheese product containing less than about 7 grams of fat per 30 gram serving size of cheese and then applying a small amount of fat (i.e., a thin layer) to the surface of the cheese in its shredded form. The total fat content (i.e., the fat in the natural cheese product and the amount of fat applied) can be controlled according to whether a reduced-fat, low-fat, or fat-free cheese is desired.

The cheese shreds of the invention are coated with a thin layer of a fat, preferably covering the entire outer surface of each individual shred, so that the beneficial aspects of the fat can be maximized with a minimal amount of fat. Preferably, the thin layer of fat is a monolayer which covers at least about 75% of the surface of the cheese shreds; more preferably, the thin layer is a monolayer which covers about 100% of the surface of the cheese shreds. Limiting the amount of fat needed by applying the fat to the cheese in a thin layer also minimizes the appearance of an oily coating on the cheese which can occur with increased amounts of fat.

A thin layer of fat on the surface of most (i.e., at least 50 percent and preferably at least 80 percent of the particles), and preferably all, shredded particles maintains the moisture content of the cheese by preventing evaporation both during storage and consumer use (especially during melting). When oriented in a thin layer on the particle surface, the fat molecules tend to repel water, thereby containing water, which otherwise would be lost through evaporation, within the cheese. With reduced levels of moisture loss from the cheese, the cheese is more likely to melt and form a continuous mass rather than maintain individual shred identity. A higher moisture content in the cheese also helps to prevent the rapid formation of a significant "skin" on the surface of the melted cheese. This skin is associated with the drying of the cheese as moisture evaporates.

In a preferred embodiment of the invention, the fat should be essentially liquid at temperatures greater than about 100° F. Liquid oils or melted fats are suitable for use in the present invention. More specifically, the fat can be an edible mono-, di- or triglyceride or non-digestible fats such as polyol fatty acid polyesters. Examples of such fats are lecithin, vegetable oil, butterfat, sucrose fatty acid polyesters and the like. Preferably, the fat should not impart any negative flavor to the cheese product. In a preferred embodiment, butterfat or fractionated butterfat are used as the fat, because they enhance dairy flavor perception, thereby providing better flavor.

To be considered fat-free, the total amount of digestible fat must be less than about 0.5 grams per single serving of cheese, which is about 30 grams of shredded cheese. The amount of fat to be applied according to the method of the invention to overcome the defects associated with fat-free cheese is preferably in the range of about 0.1 to about 0.4 grams per serving of cheese. When applying a non-digestible fat, such as sucrose fatty acid polyester, to the shredded cheese, the amount applied preferably is no more than about 4% of the total weight of the cheese.

In accordance with the method of the invention, cheese can be produced using conventional methods to ensure that the desired level of digestible fat is obtained (e.g., less than about 0.1 grams per serving). A fat then is applied to the cheese in its particle (e.g., shredded) form. If a fat-free cheese is desired, about 0.1 to about 0.4 grams of fat per serving size of shredded cheese can be applied in order to maintain the level of fat below the maximum limit of 0.5 grams per serving. Preferably, the fat applied will be no more than about 1.3% of the total weight of the cheese if the cheese contains 0.3% fat before application of the fat. To be most effective, the fat should essentially cover the surface area of the cheese particles but still provide no more than about 1.66% fat. Should it be desirable to produce a low-fat or reduced-fat shredded cheese instead, either the amount of fat contained in the cheese or the amount applied to the surface could be increased (or both could be increased). When producing these cheeses, it is preferable to provide up to about 4% of the total amount of fat to the surface of the cheese.

In a preferred method of the invention, the fat is applied as a mist to the surface of cheese as the cheese is shredded in the conventional manner. With reference to the drawings, a fat 10 is added to a reactor 12, equipped with mixer 21, where that fat is liquified (if required). Steam 11 is provided to maintain the reactor 12 at a temperature sufficient to ensure that the fat 10 is essentially liquid as it exits the reactor 12. Condensate 13 resulting from the steam is removed to a drain. In a preferred embodiment, the fats are liquids at temperatures greater than about 100°F. The liquified fat is piped to a high pressure pump 14 from the reactor 12, and then to one or more nozzles 16 located inside the cheese shredder 22. A first pump 15 is located between the reactor 12 and the high pressure pump 14. The nozzle 16 is used to apply the liquified fat to the cheese. Preferably, a high pressure, positive displacement pump 14 is used to feed the liquified fat to the nozzle 16 such that an atomized spray is generated. Preferably, the atomized spray contains liquid fat particles with diameters less than about 100 microns. More preferably, the diameters are less than about 20 microns and most preferably are less than about 10 microns. Excess fat can be returned to reactor 12 via line 19 to help control operational parameters. A T-valve 17 and a pressure regulator 18 are located on this line 19. The various lines can be heat traced (if necessary) to ensure that the fat remains liquid throughout the system.

Pieces of cheese 20 measuring approximately 4"×4"×4" are fed into a conventional cheese shredder 22, such as an Urschel chip cutter dicer, at a rate of about 50 pounds per minute. Moving cutting surfaces 24 are used to reduce the pieces of cheese 20 to shreds 26 having dimensions of about 1" ×⅛"×⅛". Of course, smaller or larger cheese pieces can be used if desired; and faster or slower feed rates can be used if desired; and smaller or larger dimension shredded cheese can be produced if desired. One or more nozzles 16 are positioned to deliver a spray, preferably in atomized form, of the liquified fat to the surface of the cheese as it is shredded by the cutting surfaces 24. Preferably, the fat is applied to the cheese 20 as it is being shredded, but the fat also can be applied to the cheese shreds 26 after they have passed through the cutting surfaces 24. If the fat is applied to the cheese 20 as it is being shredded using standard shredding equipment 24, the fat may also act as a processing aid to increase the lubricity of the cheese, which thereby improves shredability and increases process output.

Although not shown in the drawings, more than one nozzle 16 can be used to apply the desired fat. Indeed, it is generally preferred that more than one nozzle is used to ensure more uniform coverage of the fat on the cheese shreds. For example, four (or more) nozzles could be used to essentially surround the cutting surfaces 24 thereby help to insure that all surfaces of the particles are coated with the fat in a uniform manner.

The pump 14 can be calibrated to deliver the desired amount of fat. For example, for a fat-free shredded cheese and using conventional shredding equipment, about 0.1 to about 1.3 pounds of the fat could be supplied per approximately 100 pounds of cheese. The fat preferably should be applied in such a manner as to coat completely and uniformly (i.e., essentially a monolayer) the individual shreds of cheese 26. Of course, greater or lesser coverage can be used if desired.

From the shredder 22, the cheese shreds 26 then can be conveyed via a conveyor 27 to standard cheese packaging equipment 28 for packaging in conventional film or other packaging material for retail use. After shredding but before packaging 28, an anti-caking agent 30, if desired, can be applied either in the shredder (not shown) or to the cheese shreds 26 after shredding. An anti-caking agent 30 typically is added to prevent the cheese shreds 26 from sticking together during processing and after packaging. Depending on the anti-caking agent 30 used, the cheese might have an unpleasant, chalky mouthfeel due to the anti-caking agent. In that case, a reduction in the amount of agent 30 needed will be required to minimize or even eliminate this characteristic. Examples of anti-caking agents 30 are cellulose powders, cellulose gels, rice flour and food grade starch. The amount of anti-caking agent 30 can be significantly reduced, or even eliminated in the present invention, as compared to conventional shredded cheese, because the monolayer of fat on the surface of the cheese shreds 26 can also prevent (or at least reduce) the particles from sticking together.

If desired, a flavor system (or other additives) can be mixed with the fat before it is applied to the surface of the cheese shreds. The effect of the flavorings should be enhanced by application on the surface rather than throughout the cheese, thereby allowing the amount of flavoring to be reduced.

In another embodiment of the invention, the cheese first is shredded using conventional equipment. Prior to the application of any anti-caking agent, the fat is applied to the surface of the cheese shreds in the same manner as described above. Thus, the fat can be applied during and/or after the shredding process.

The following example illustrates the invention and should be understood to be illustrative of, but not limiting upon, the scope of the invention, which is defined in the appended claims.

EXAMPLE

Two ounces of treated shredded fat-free natural cheese were distributed over the surface of a slice of white bread. The treated shredded fat-free natural cheese was prepared using lecithin applied at about 0.02 g/g of cheese, which based on a visual inspection, appeared to coat the entire surface of the cheese shreds. A control slice was prepared by distributing a similar fat-free shredded cheese without added fat over a slice of white bread. The cheese-topped bread was placed in a standard electric kitchen oven range at a temperature of about 425° F. and baked for approximately six minutes.

The degree of melt of the fat-treated cheese slice was compared to the control slice. Visual examination of the test slices indicated that the treated shredded cheese achieved complete melt with no individual shred identity remaining, whereas the untreated cheese only melted slightly and retained the original shredded shape.

Numerous modifications to the invention are possible to further improve enhancement of the desirable characteristics of surface fat added to cheese. Thus, modifications and variations in practice of the invention are expected to occur to those skilled in the art upon consideration of the foregoing detailed description of the invention. Although preferred embodiments have been described above and illustrated in the accompanying drawings, there is no intent to limit the scope of the invention to these or other particular embodiments.

What is claimed is:

1. A reduced-fat cheese product having improved organoleptic properties, said reduced-fat cheese product comprising particles of a reduced-fat cheese product coated with a thin layer of fat, wherein the thin layer of fat provides improved organoleptic properties and wherein the cheese product contains less than about 0.23 grams fat per gram of cheese product.

2. A reduced-fat cheese product in accordance with claim 1, wherein said cheese product contains less than about 0.02 grams fat per gram of cheese product.

3. A reduced-fat cheese product in accordance with claim 2, wherein said fat is essentially liquid at 100° F.

4. A reduced-fat cheese product in accordance with claim 3, wherein said fat is selected from the group consisting of mono-, di-, and triglycerides, lecithin, polyol fatty acid polyesters, butterfat, and fractions of butterfat.

5. A reduced-fat cheese product in accordance with claim 2, wherein said particles are shreds having an average dimension of about 1"×⅛"×⅛".

6. A reduced-fat cheese product in accordance with claim 1, wherein said cheese product contains between about 0.003 and about 0.01 grams fat per gram of cheese product.

7. A reduced-fat cheese product in accordance with claim 6, wherein said fat is essentially liquid at 100° F.

8. A reduced-fat cheese product in accordance with claim 7, wherein said fat is selected from the group consisting of mono-, di-, and triglycerides, lecithin, polyol fatty acid polyesters, butterfat, and fractions of butterfat.

9. A reduced-fat cheese product in accordance with claim 6, wherein said particles are shreds having an average dimension of about 1"×⅛"×⅛".

10. A reduced-fat cheese product in accordance with claim 1, wherein said fat is essentially liquid at 100° F.

11. A reduced-fat cheese product in accordance with claim 10, wherein said fat is selected from the group consisting of mono-, di-, and triglycerides, lecithin, polyol fatty acid polyesters, butterfat, and fractions of butterfat.

12. A reduced-fat cheese product in accordance with claim 1, wherein said particles are shreds having an average dimension of about 1"×⅛"×⅛".

13. A method of manufacturing a reduced-fat cheese product comprising applying a thin layer of a fat to particles of a reduced-fat cheese product, wherein said thin layer of fat provides improved organoleptic properties and wherein the resulting cheese product contains less than about 0.23 grams fat per gram of cheese product.

14. A method in accordance with claim 13, wherein said resulting cheese product contains less than about 0.02 grams fat per gram of cheese product.

15. A method in accordance with claim 14, wherein said fat is essentially liquid at 100° F.

16. A method in accordance with claim 15, wherein said fat is selected from the group consisting of mono-, di-, and triglycerides, lecithin, polyol fatty acid polyesters, butterfat, and fractions of butterfat.

17. The method of claim 13, wherein said particles are shreds having an average dimension of about 1"×⅛"×⅛".

18. The method of claim 14, wherein said particles are shreds having an average dimension of about 1"−⅛"×⅛".

19. A method in accordance with claim 13, wherein said resulting cheese product contains about 0.003 to about 0.01 grams fat per gram of cheese product.

20. A method in accordance with claim 19, wherein said fat is essentially liquid at 100° F.

21. A method in accordance with claim 20, wherein said fat is selected from the group consisting of mono-, di-, and triglycerides, lecithin, polyol fatty acid polyesters, butterfat, and fractions of butterfat.

22. A method in accordance with claim 20, wherein said fat is applied to the cheese product as an atomized mist whose particles have an average diameter of less than about 10 microns.

23. The method of claim 19, wherein said particles are shreds having an average dimension of about 1"–⅛"×⅛".

24. A method in accordance with claim 13, wherein said fat is essentially a liquid at 100° F.

25. A method in accordance with claim 24, wherein said fat is applied to the cheese product as an atomized mist whose particles have an average diameter of less than about 100 microns.

26. A method in accordance with claim 24, wherein said fat is selected from the group consisting of mono-, di-, and triglycerides, lecithin polyol fatty acid polyesters, butterfat, and fractions of butterfat.

27. A method in accordance with claim 15, wherein said fat is applied to the cheese product as an atomized mist whose particles have an average diameter of less than about 20 microns.

\* \* \* \* \*

UNITED STATES PATENT AND TRADEMARK OFFICE
CERTIFICATE OF CORRECTION

PATENT NO. : 5,876,770
DATED : March 2, 1999
INVENTOR(S) : ZAIKOS, et al.

It is certified that error appears in the above-identified patent and that said Letters Patent is hereby corrected as shown below:

Column 6, line 64 change "1"-1/8"x1/8" to --1"x1/8"x1/8".--

Column 7, line 12 change "1"-1/8"x1/8" to --1"x1/8"x1/8".--

Signed and Sealed this

Twenty-fourth Day of August, 1999

Attest:

Q. TODD DICKINSON

*Attesting Officer*     *Acting Commissioner of Patents and Trademarks*